United States Patent
Higgins et al.

(10) Patent No.: US 10,839,419 B2
(45) Date of Patent: Nov. 17, 2020

(54) MULTI-LAYERED PRODUCT VALUE SCORE GENERATION

(71) Applicant: INTERNATIONAL BUSINESS MACHINES CORPORATION, Armonk, NY (US)

(72) Inventors: ChunHui Y. Higgins, Raleigh, NC (US); Bo Zhang, Cary, NC (US); Chul Sung, Austin, TX (US); Laura G. Ellis, Austin, TX (US); Janhavi Das, Austin, TX (US); Blake McGregor, Foster City, CA (US); Adam M. Gunther, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 15/865,735

(22) Filed: Jan. 9, 2018

(65) Prior Publication Data

US 2019/0213629 A1 Jul. 11, 2019

(51) Int. Cl.
*G06Q 30/02* (2012.01)

(52) U.S. Cl.
CPC ..... *G06Q 30/0246* (2013.01); *G06Q 30/0247* (2013.01)

(58) Field of Classification Search
CPC ........................ G06Q 30/0246; G06Q 30/0247
USPC ...................................................... 705/14.45
See application file for complete search history.

(56) References Cited

U.S. PATENT DOCUMENTS

| | | |
|---|---|---|
| 2007/0067225 A1 | 3/2007 | Smith et al. |
| 2008/0255925 A1 | 10/2008 | Vailaya et al. |
| 2011/0106582 A1 | 5/2011 | Jones |
| 2013/0132165 A1 | 5/2013 | McNeill et al. |
| 2014/0136549 A1 | 5/2014 | Surya et al. |

(Continued)

FOREIGN PATENT DOCUMENTS

WO   WO-2008019007 A2 * 2/2008 ........... G06F 16/353

OTHER PUBLICATIONS

Thomas Kilroy, This article—our first in a series on pricing in retail—focuses on key value categories (KVCs) and key value items (KVIs) as a core part of price strategy in today's digital retail environment, 2015 (Year: 2015).*

(Continued)

*Primary Examiner* — Tarek Elchanti
(74) *Attorney, Agent, or Firm* — Schmeiser, Olsen & Watts; Mark C. Vallone

(57) ABSTRACT

An approach is provided for determining a product value score. Features of a product are identified. Ranking data for each identified feature is collected. The ranking data includes popularity, stability, availability, and memory usage of each feature. Additional data for each feature are determined. The additional data includes an importance, a conversion rate, and a marketing impact of each feature. Based on the ranking data and the additional data, normalized data is generated according to characteristics of the features. Based on a data science prediction analysis which uses the identified features, weights of the features are determined. Based on initial results of the data science prediction analysis, a key product is selected from a set of products. Based on the key product and the weights, product value scores of products in the set of products are determined.

17 Claims, 4 Drawing Sheets

(56) References Cited

U.S. PATENT DOCUMENTS

2014/0200935 A1    7/2014   Davies et al.
2014/0297476 A1   10/2014   Wang et al.
2017/0032456 A1    2/2017   Strauss et al.

OTHER PUBLICATIONS

Ingale, Sonali D. et al.; Identifying and Ranking Dominating Product Features using NLP Technique; International Journal of Computer Applications; vol. 122, No. 17; Jul. 2015; pp. 14-17.

* cited by examiner

MULTI-LAYERED PRODUCT VALUE SCORE GENERATION

BACKGROUND

The present invention relates to managing a pricing strategy, and more particularly to calculating a product value score.

Known cloud solutions provide software as a service (SaaS), platform as a service (PaaS), and infrastructure as a service (IaaS) to customers. Freemium is a pricing strategy by which a product or service is provided free of charge, but money (i.e., a premium) is charged for proprietary features, functionality, or virtual goods. The product or service provided by Freemium is typically a digital offering or application, such as software, media, games, or web services. To execute the Freemium plan, knowledge of which products, services, or features are valuable and can be provided as proprietary products, services, or features is important.

SUMMARY

In one embodiment, the present invention provides a method of determining a score of a value of a product. The method includes a computer identifying features of the product. The method further includes the computer collecting ranking data for each feature in the identified features. The ranking data includes a popularity of each feature among users, a stability of each feature, an availability of each feature in similar products, and a memory usage in each feature. The method further includes the computer determining additional data for each feature. The additional data includes an indication of an importance of each feature, a conversion rate for each feature, and a marketing impact of each feature. The method further includes based on the ranking data and the additional data, the computer generating normalized data according to respective characteristics of the identified features. The method further includes based on a data science prediction analysis which uses the identified features, the computer determining weights of the features. The method further includes based on initial results of the data science prediction analysis, the computer selecting a key product from a set of products. The method further includes based on the key product and the weights, the computer determining respective scores of values of the products in the set of products.

In another embodiment, the present invention provides a computer program product for determining a score of a value of a product. The computer program product includes a computer readable storage medium having program instructions stored on the computer readable storage medium. The computer readable storage medium is not a transitory signal per se. The program instructions are executed by a central processing unit (CPU) of a computer system to implement a method. The method includes the computer system identifying features of the product. The method further includes the computer system collecting ranking data for each feature in the identified features. The ranking data includes a popularity of each feature among users, a stability of each feature, an availability of each feature in similar products, and a memory usage in each feature. The method further includes the computer system determining additional data for each feature. The additional data includes an indication of an importance of each feature, a conversion rate for each feature, and a marketing impact of each feature. The method further includes based on the ranking data and the additional data, the computer system generating normalized data according to respective characteristics of the identified features. The method further includes based on a data science prediction analysis which uses the identified features, the computer system determining weights of the features. The method further includes based on initial results of the data science prediction analysis, the computer system selecting a key product from a set of products. The method further includes based on the key product and the weights, the computer system determining respective scores of values of the products in the set of products.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of determining a score of a value of a product. The method includes the computer system identifying features of the product. The method further includes the computer system collecting ranking data for each feature in the identified features. The ranking data includes a popularity of each feature among users, a stability of each feature, an availability of each feature in similar products, and a memory usage in each feature. The method further includes the computer system determining additional data for each feature. The additional data includes an indication of an importance of each feature, a conversion rate for each feature, and a marketing impact of each feature. The method further includes based on the ranking data and the additional data, the computer system generating normalized data according to respective characteristics of the identified features. The method further includes based on a data science prediction analysis which uses the identified features, the computer system determining weights of the features. The method further includes based on initial results of the data science prediction analysis, the computer system selecting a key product from a set of products. The method further includes based on the key product and the weights, the computer system determining respective scores of values of the products in the set of products.

Embodiments of the present invention provide an advanced scientific method to calculate product value scores from multiple perspectives, such as product management, business value, marketing, user behavior, and user experience, to obtain scores that are more accurate than known approaches that generate scores from only a single specific perspective.

DETAILED DESCRIPTION

Overview

Embodiments of the present invention provide a scientific method to calculate product value scores, using various nested data science prediction and feature selection methods in a multi-layer process. The product value scores are calculated accurately by utilizing multiple stakeholder perspectives, such as product management (e.g., which products are important from a business strategy perspective), business value (e.g., revenue per unit), marketing demand, user behavior (e.g., how many times customers try the product), and user experience (e.g., Net Promoter Score). The product value score determination uses a layer of data preparation followed by another layer of determining a most valuable product and using the most valuable product in an enhanced similarity calculation. The enhanced similarity calculation is used to determine product value scores without losing raw data relative ranking information.

System for Determining a Product Value Score

Figure 1:
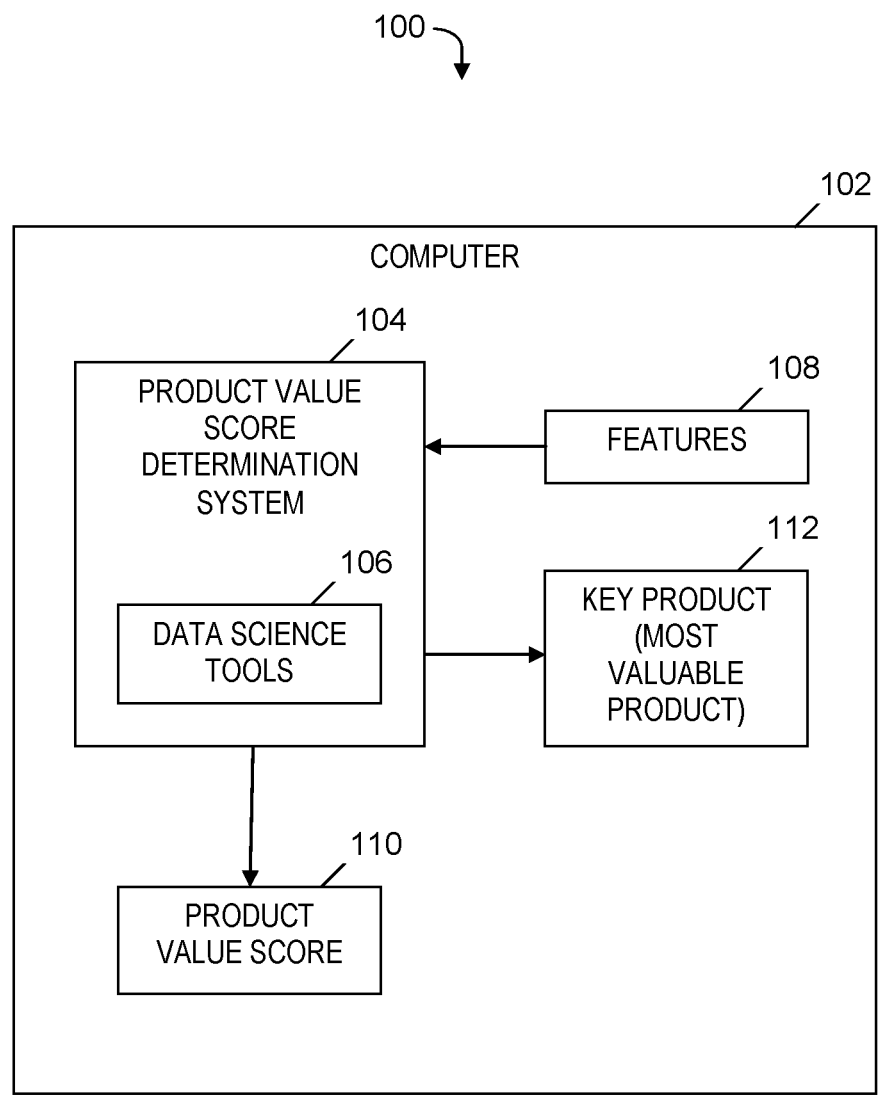
FIG. 1 is a block diagram of a system for determining a score of a value of a product, in accordance with embodiments of the present invention.

FIG. 1 is a block diagram of a system 100 for determining a score of a value of a product, in accordance with embodiments of the present invention. System 100 includes a computer 102, which executes a software-based product value score determination system 104, which includes data science tools 106. Product value score determination system 104 receives features 108 of a product and identifies a subset of features 108 that includes features that are sufficiently important to use in a calculation of a product value score 110 (i.e., a score of a value of the product). Data science tools 106 provide data science prediction methods that identify the important features included in features 108.

Product value score determination system 104 determines ranking data and additional data that provide measurements of attributes of features 108 from various stakeholder perspectives. Product value score determination system 104 assigns weights to features 108 in a one-to-one correspondence. In one embodiment, a weight of a feature of a product specifies the relative impact that the feature has on a customer's decision to purchase the product. Data science tools 106 include data science feature selection methods that obtain each feature's weight.

Product value score determination system 104 uses data science and analysis methods included in data science tools 106 to identify a key product 112 from a set of products. For example, product value score determination system 104 uses a binning method, business value calculation, percentile, k-means clustering, and decision tree analysis. Product value score determination system 104 consolidates and normalizes the results of the data science and analysis methods to identify key product 112. Product value score determination system 104 uses an enhanced similarity calculation with the weights of each feature to determine the product value score 110.

Figure 2:
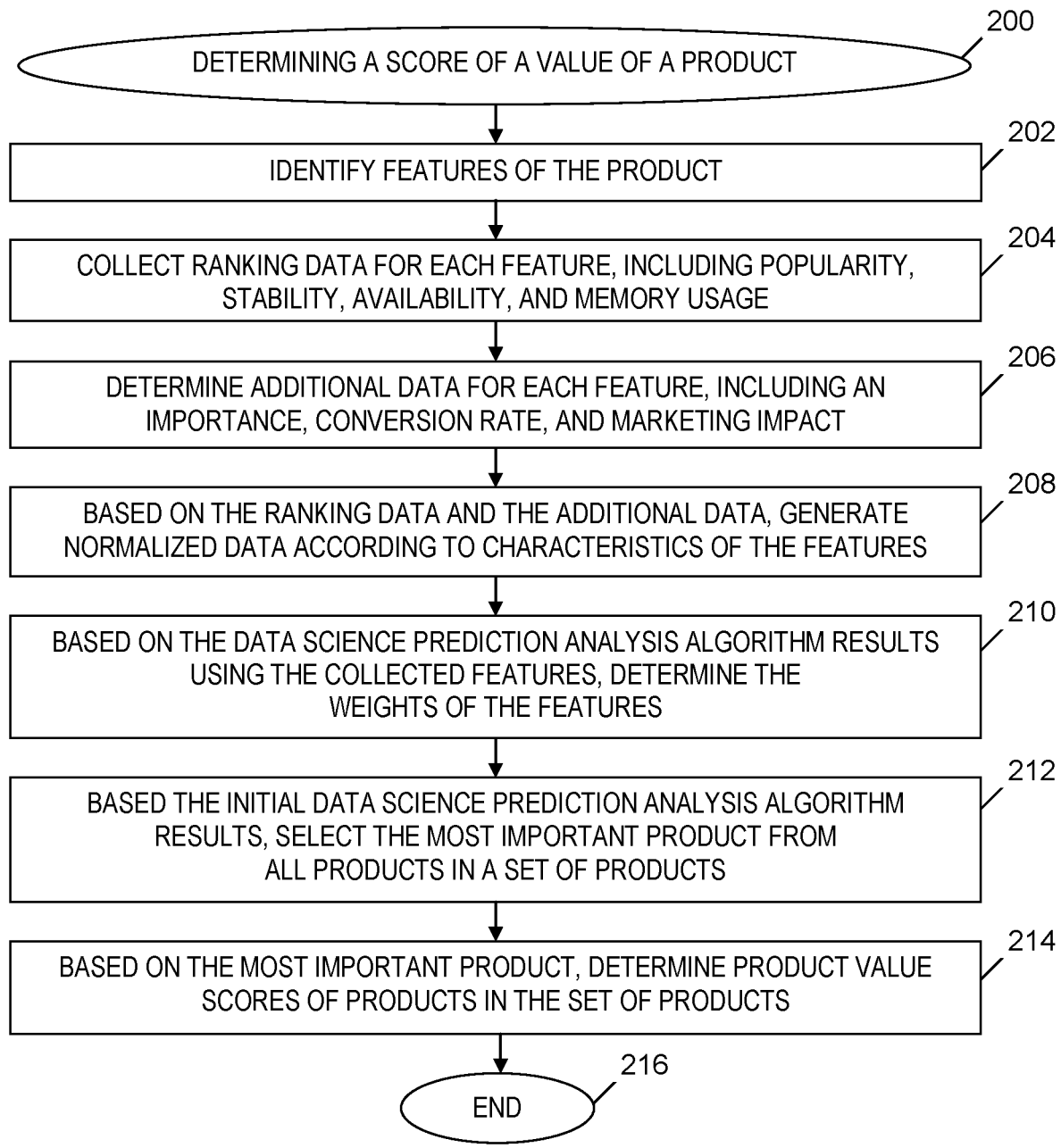
FIG. 2 is a flowchart of a process of determining a score of a value of a product, where the process is implemented by the system of FIG. 1, in accordance with embodiments of the present invention.
Figure 3:
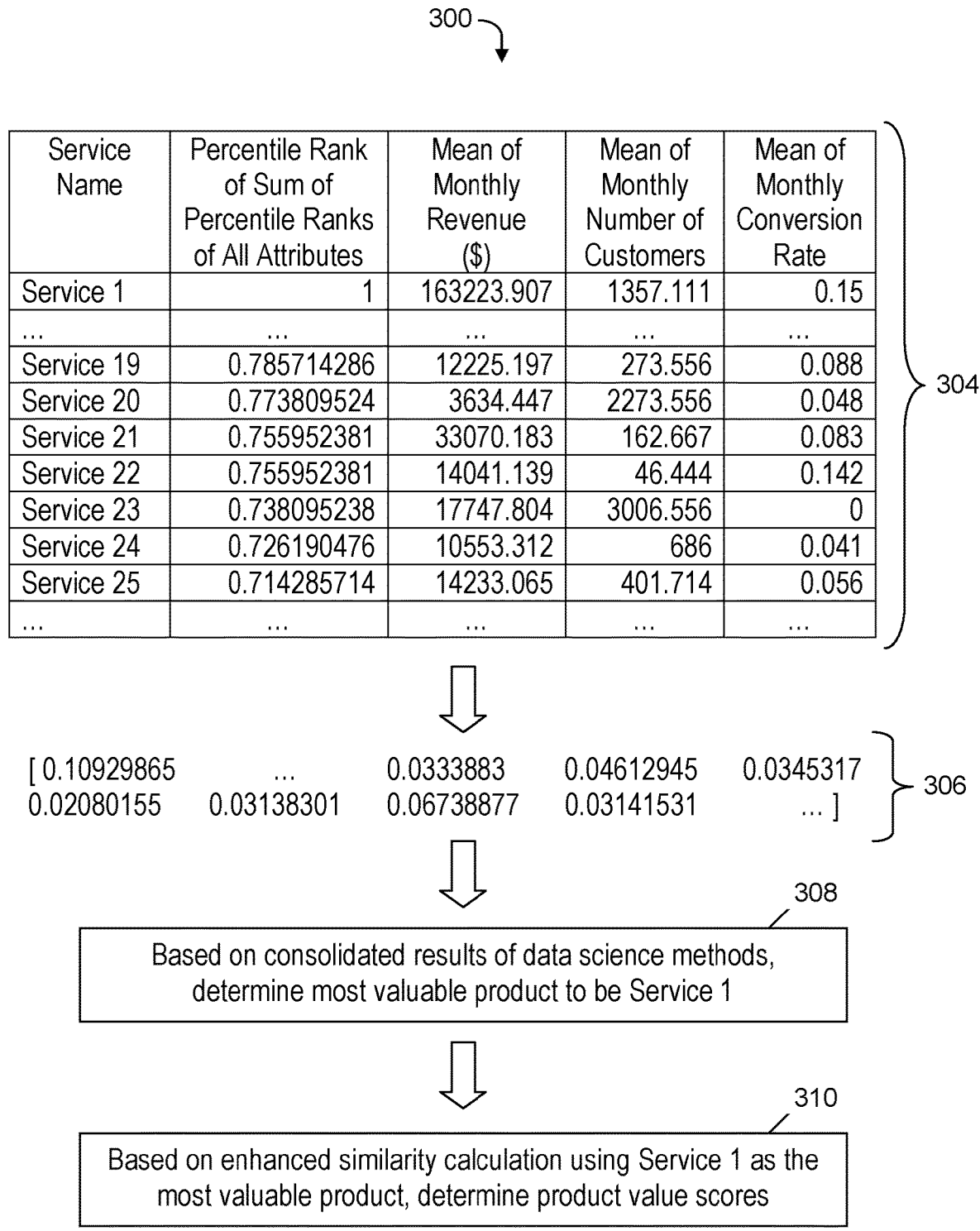
FIG. 3 is an example of a portion of the process of FIG. 2, in accordance with embodiments of the present invention.
Figure 4:
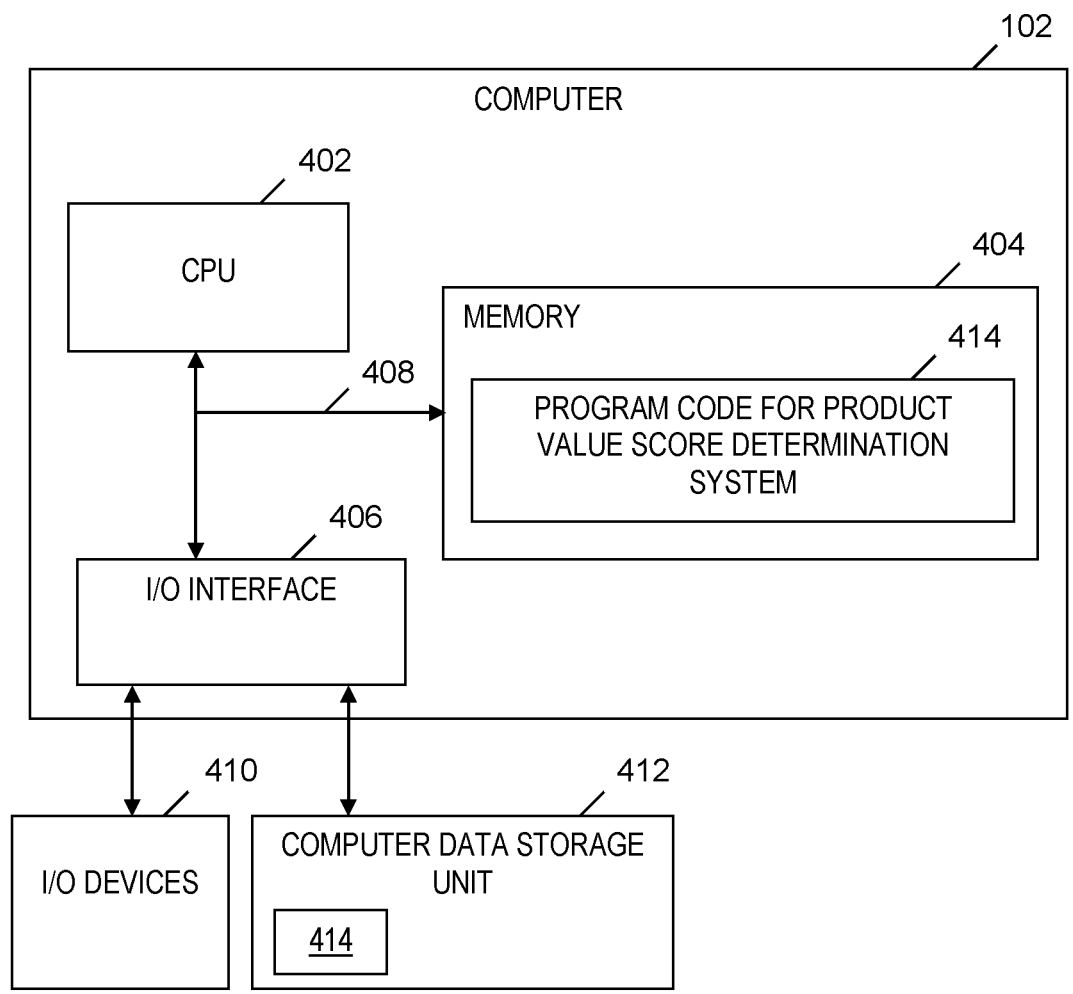
FIG. 4 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Determining a Product Value Score

FIG. 2 is a flowchart of a process of determining a score of a value of a product, where the process is implemented by the system of FIG. 1, in accordance with embodiments of the present invention. Product value scores determined by the process of FIG. 2 are based on characteristics of various features of a product. The most valuable features of the product are identified in a set of other products. The other products are ranked according to the use of the most valuable features by a given product. The product value is based on an enhanced similarity calculation using nested data science methods with weighted attributes from a previous data science predication result.

The process of FIG. 2 starts at step 200. In step 202, product value score determination system 104 (see FIG. 1) identifies features of a product that are important enough to be used in a calculation of product value score 110 (see FIG. 1). The features are identified in step 202 by using data science predication methods and by using an interdisciplinary collaboration to determine additional features to be considered.

In step 204, product value score determination system 104 (see FIG. 1) collects ranking data for each feature. The ranking data includes a popularity of each feature among users, a stability of each feature, an availability of each feature in similar products, and a memory usage in each feature.

In step 206, product value score determination system 104 (see FIG. 1) determines additional data for each feature. The additional data includes an indication of an importance of each feature to a customer's purchase decision, a conversion rate for each feature, and a marketing impact of each feature. In one embodiment, the additional data includes data about the product specifying product on demand, marketing strategy, service combination, and inbound or outbound services.

In step 208, based on the ranking data collected in step 204 and the additional data determined in step 206, product value score determination system 104 (see FIG. 1) generates normalized data according to characteristics of the features, so that each type of data in the ranking data and the additional data has the same scale, without losing the relative importance of each feature. In one embodiment, product value score determination system 104 (see FIG. 1) normalizes the data in step 208 by using each feature's revenue percentile value against the total revenue.

In step 210, product value score determination system 104 (see FIG. 1) determines weights of the features by using results of a data science prediction analysis algorithm, which uses the features identified in step 202 and the data generated in step 208, and which is included in data science tools 106 (see FIG. 1). A weight of a feature of a product indicates the relative impact that the feature has on a customer's decision to purchase the product.

In step 212, based on the results of the data science prediction analysis algorithm, product value score determination system 104 (see FIG. 1) selects the most important product (i.e., key product 112 (see FIG. 1)) from all products in a set of products. As used herein, a key product is defined as the most important product in a set of products. In one embodiment, product value score determination system 104 (see FIG. 1) selects the key product in step 212 by using a combination of a binning method, a business value calculation, a percentile, k-means clustering, and decision tree analysis to identify key product 112 (see FIG. 1). In step 212, product value score determination system 104 (see FIG. 1) consolidates and normalizes the results of using the data science and analysis methods to identify key product 112 (see FIG. 1).

In step 214, based on the key product 112 (see FIG. 1) selected in step 212 and the weights determined in step 210, product value score determination system 104 (see FIG. 1) determines product value scores of products in the set of products. In step 214, product value score determination system 104 (see FIG. 1) uses an enhanced similarity calculation which uses the weights of the features to determine the product value scores.

In one embodiment, the enhanced similarity calculation in step 214 utilizes formula (1) presented below, where p=key product value, q=feature value, and w=assigned weight of a feature, which indicates the relative importance of the feature.

$$d(p, q) = d(q, p) = \sqrt{(q_1 - p_1)^2 w_1 + (q_2 - p_2)^2 w_2 + \cdots + (q_n - p_n)^2 w_n} \qquad (1)$$
$$= \sqrt{\sum_{i=1}^{n} (q_i - p_i)^2 w_i}$$

After step 214, the process of FIG. 2 ends at step 216. Business stakeholders use the product value scores to promote products and define new business plans or strategies.

Example

FIG. 3 is an example 300 of a portion of the process of FIG. 2, in accordance with embodiments of the present invention. Example 300 starts at a table 304 that includes a mean monthly revenue, mean monthly number customers, mean monthly conversion rate, and a percentile rank used in step 208 (see FIG. 2) to generate normalized data. Among the features selected from features 108 (see FIG. 1), product value score determination system 104 (see FIG. 1) determines weights 306 assigned to the features, respectively, which is an example of step 210 (see FIG. 2). In step 308, based on consolidated results of data science methods such as a binning method, business value calculation, percentile, k-means clustering, and decision tree analysis, product value score determination system 104 (see FIG. 1) selects Service 1 from the services listed in table 304 as being the most valuable product. Selecting Service 1 as the most valuable product is an example of step 212 (see FIG. 2). In step 310, based on an enhanced similarity calculation using Service 1 as the most valuable product, product value score determination system 104 (see FIG. 1) determines product value scores, which is an example of step 214 (see FIG. 2).

Computer System

FIG. 4 is a block diagram of a computer that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 to perform a method of determining a product value score, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to determine a product value score. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) may include features selected from features 108 (see FIG. 1), key product 112 (see FIG. 1), and/or product value score 110 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to determining a product value score. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to determine a product value score. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of determining a product value score.

While it is understood that program code 414 for determining a product value score may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of determining a product value score. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining a score of a value of a product, the method comprising the steps of:
   a computer identifying features of the product;
   the computer collecting ranking data for each feature in the identified features, the ranking data including a popularity of each feature among users, a stability of each feature, an availability of each feature in similar products, and a memory usage in each feature;
   the computer determining additional data for each feature, the additional data including an indication of an importance of each feature and a conversion rate for each feature;
   the computer converting the ranking data and the additional data to a same scale:
   based on the ranking data and the additional data, the computer generating normalized data according to respective characteristics of the identified features;
   determining by a product value score determination system using a data science prediction analysis algorithm, weights of the features, the product value score determination system being executed by one or more processors of the computer:
   selecting, by the product value score determination system using a binning method, k-means clustering, and a decision tree analysis, a key product from a set of products;
   determining, by the product value score determination system using the key product and the weights, respective scores of values of the products in the set of products; and
   displaying, by the product value score determination system, the key product.

2. The method of claim 1, wherein the step of generating the normalized data includes determining a percentile value of revenue of a feature of the product against total revenue of the product.

3. The method of claim 1, wherein the step of determining the weights of the features includes identifying a most valuable feature among the features by applying the binning method, a business value calculation, a percentile, the k-means clustering, and a decision tree.

4. The method of claim 3, further comprising the steps of:
   the computer consolidating data from the binning method, the business value calculation, the percentile, the k-means clustering, and the decision tree; and
   the computer normalizing the consolidated data, wherein the step of identifying the most valuable feature is based on the normalized consolidated data.

5. The method of claim 1, further comprising the steps of:
   for each product, the computer determining distances between data specifying features of a given product and data specifying corresponding features of the key product; the computer weighting the distances according to the weights; and based on the weighted distances, the computer determining values indicating similarities of the products to the key product, wherein the step of determining the respective scores of the values of the products in the set of products is based on the values indicating the similarities of the products to the key product.

6. The method of claim 5, wherein the step of determining the distances includes determining distances between features of the product and respective features of the key product.

7. The method of claim 1, further comprising the step of:
   providing at least one support service for at least one of creating, integrating, hosting, maintaining, and deploying computer readable program code in the computer, the program code being executed by a processor of the computer to implement the steps of identifying the features of the product, collecting the ranking data, determining the additional data for each feature, converting the ranking data and the additional data, generating the normalized data, determining the weights of the features, selecting the key product, determining the respective scores of values of the products in the set of products, and displaying the key product.

8. A computer program product for determining a score of a value of a product, the computer program product comprising a computer readable storage medium having program instructions stored in the computer readable storage medium, wherein the computer readable storage medium is not a transitory signal per se, the program instructions are executed by a central processing unit (CPU) of a computer system to cause the computer system to perform a method comprising the steps of:

the computer system identifying features of the product;

the computer system collecting ranking data for each feature in the identified features, the ranking data including a popularity of each feature among users, a stability of each feature, an availability of each feature in similar products, and a memory usage in each feature;

the computer system determining additional data for each feature, the additional data including an indication of an importance of each feature and a conversion rate for each feature;

the computer system converting the ranking data and the additional data to a same scale:

based on the ranking data and the additional data, the computer system generating normalized data according to respective characteristics of the identified features;

determining, by a product value score determination system using a data science prediction analysis algorithm, weights of the features, the product value score determination system being included in the computer system and executed by the CPU:

selecting, by the product value score determination system using a binning method, k-means clustering, and a decision tree analysis, a key product from a set of products;

determining, by the product value score determination system using the key product and the weights, respective scores of values of the products in the set of products; and displaying, by the product value score determination system, the key product.

9. The computer program product of claim 8, wherein the step of generating the normalized data includes determining a percentile value of revenue of a feature of the product against total revenue of the product.

10. The computer program product of claim 8, wherein the step of determining the weights of the features includes identifying a most valuable feature among the features by applying the binning method, a business value calculation, a percentile, the k-means clustering, and a decision tree.

11. The computer program product of claim 10, wherein the method further comprises the steps of:

the computer system consolidating data from the binning method, the business value calculation, the percentile, the k-means clustering, and the decision tree; and the computer system normalizing the consolidated data, wherein the step of identifying the most valuable feature is based on the normalized consolidated data.

12. The computer program product of claim 8, wherein the method further comprises the steps of:

for each product, the computer system determining distances between data specifying features of a given product and data specifying corresponding features of the key product; the computer system weighting the distances according to the weights; and based on the weighted distances, the computer system determining values indicating similarities of the products to the key product, wherein the step of determining the respective scores of the values of the products in the set of products is based on the values indicating the similarities of the products to the key product.

13. A computer system comprising: a central processing unit (CPU);

a product value score determination system executed by the CPU:

a memory coupled to the CPU; and a computer readable storage medium coupled to the CPU, the computer readable storage medium containing instructions that are executed by the CPU via the memory to implement a method of determining a score of a value of a product, the method comprising the steps of the computer system identifying features of the product; the computer system collecting ranking data for each feature in the identified features, the ranking data including a popularity of each feature among users, a stability of each feature, an availability of each feature in similar products, and a memory usage in each feature;

the computer system determining additional data for each feature, the additional data including an indication of an importance of each feature and a conversion rate for each feature;

the computer system converting the ranking data and the additional data to a same scale:

based on the ranking data and the additional data, the computer system generating normalized data according to respective characteristics of the identified features;

determining, by the product value score determination system using a data science prediction analysis algorithm, weights of the features;

selecting, by the product value score determination system using a binning method, k-means clustering, and a decision tree analysis, a key product from a set of products;

determining, by the product value score determination system using the key product and the weights;

respective scores of values of the products in the set of products; and displaying, by the product value score determination system, the key product.

14. The computer system of claim 13, wherein the step of generating the normalized data includes determining a percentile value of revenue of a feature of the product against total revenue of the product.

15. The computer system of claim 13, wherein the step of determining the weights of the features includes identifying a most valuable feature among the features by applying the binning method, a business value calculation, a percentile, the k-means clustering, and a decision tree.

16. The computer system of claim 15, wherein the method further comprises the steps of:

the computer system consolidating data from the binning method, the business value calculation, the percentile, the k-means clustering, and the decision tree; and the computer system normalizing the consolidated data, wherein the step of identifying the most valuable feature is based on the normalized consolidated data.

17. The computer system of claim 13, wherein the method further comprises the steps of:

for each product, the computer system determining distances between data specifying features of a given product and data specifying corresponding features of the key product; the computer system weighting the distances according to the weights; and based on the weighted distances, the computer system determining values indicating similarities of the products to the key product, wherein the step of determining the respective scores of the values of the products in the set of products is based on the values indicating the similarities of the products to the key product.

* * * * *